Feb. 7, 1961 E. H. STEWART, JR 2,971,137
POWER CONTROL CIRCUIT
Filed July 28, 1958
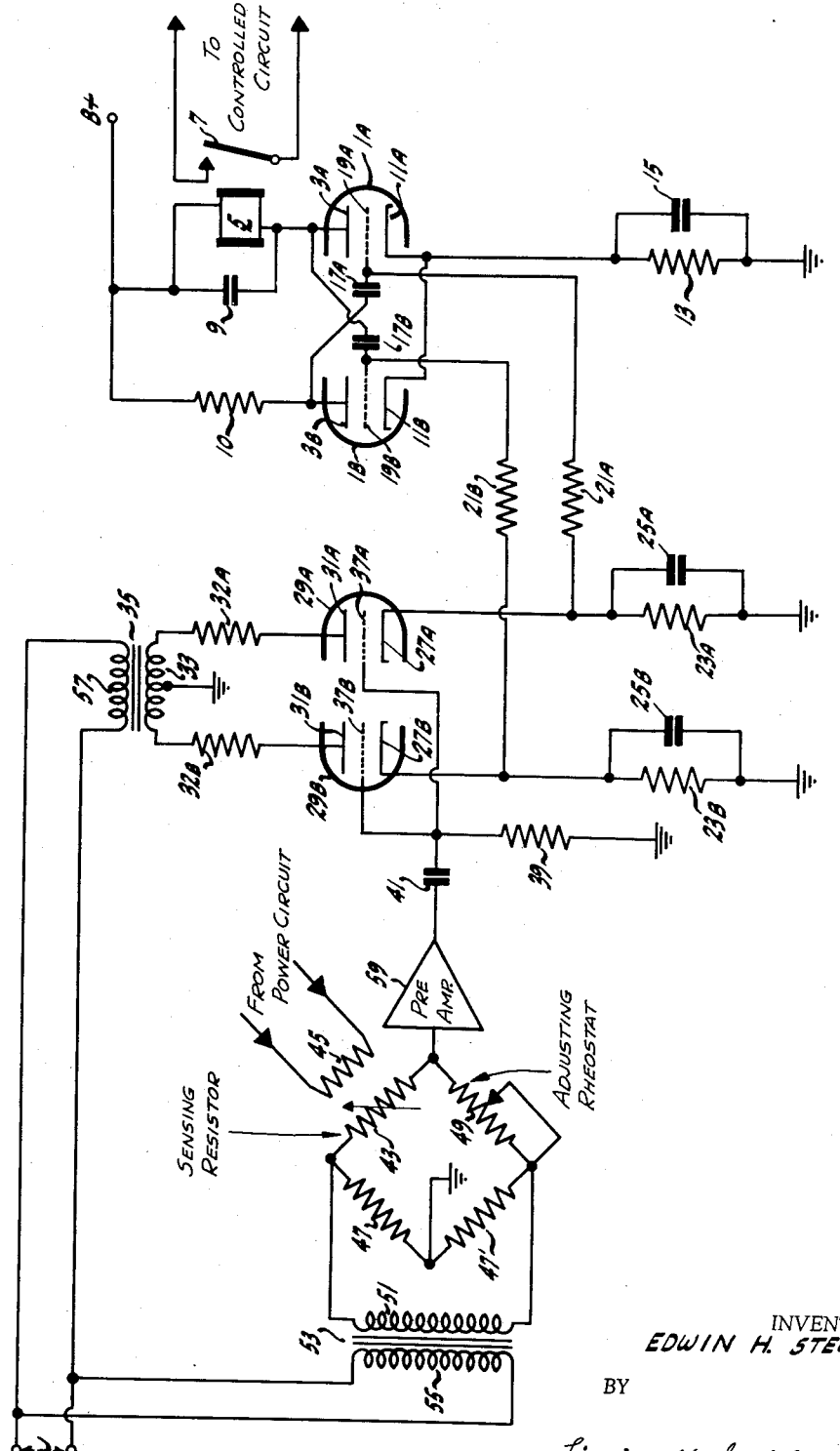
INVENTOR.
EDWIN H. STEWART, JR.
BY
Lippincott, Smith & Ralls
ATTORNEYS

United States Patent Office 2,971,137
Patented Feb. 7, 1961

2,971,137

POWER CONTROL CIRCUIT

Edwin H. Stewart, Jr., Palo Alto, Calif., assignor to Electronic Processes Corporation of California, San Francisco, Calif., a corporation of California Filed July 28, 1958, Ser. No. 751,474

6 Claims. (Cl. 317—142)

This invention relates to control apparatus for use in systems of the type wherein the energy delivered varies between two fixed values, a minimum and a maximum. Typical of such systems are those customarily used for thermostatic control temperature wherein, as commonly practiced, the energy supplied for heating is turned on when the temperature falls below one fixed value, remains on at full energy until the temperature rises to another fixed value and is then turned off and remains off until the temperature falls back to the initial value. In such systems the minimum rate of energy supply is usually zero, although this is not necessarily the case; some energy may be supplied when the thermostatic control is in the "off" condition and only incremental energy be added or subtracted as the temperature varies between the upper and lower limits fixed by the apparatus. Systems are available wherein control is substantially continuous but when the amount of energy supplied exceeds a very moderate value the complication and expense of continuous control makes this type of apparatus commercially impractical.

Where the thermostatic control energy is supplied other than electrically, there are additional difficulties in the way of continuous control. Gas or oil furnaces are in general inefficient or unstable at low output rates and are therefore almost invariably operated at either full output or zero output, being supplied with a constantly burning pilot flame and a fuel valve which is either opened or closed by actuation of the control thermostat.

In any system of the type described it is obvious that the temperature does not remain constant but oscillates around a mean value and the amplitude of the oscillation may be quite considerable. Several factors contribute to this. In addition to the necessity for some margin between the on and off positions of the thermostat, there is always some lag in response to the application of power. Thus, for example, in the familiar application of thermostatically controlled house heating by forced circulation, hot air furnace, fired by gas or fuel oil, assume that the thermostat is set to cut in or out at a one degree margin, that it is cut out and that the room is cooling. The thermostat cuts in and the flame lights. The blower does not cut in simultaneously, for the heating chamber within the furnace has cooled and an immediate start of the blower would result in the circulation of relatively cool air which the occupants might find unpleasant. The room therefore continues to cool for a longer or shorter time until the hot air chamber rises to some fixed temperature, at which time the blower cuts in and starts to raise the temperature. Before this happens the room temperature may have dropped another degree and therefore the temperature must be raised two degrees, instead of but one, before the thermostat again operates to cut off the flame. The blower, however, continues to run, frequently for a period of several minutes, until the circulation of air through the heating chamber has cooled it down to a point where the blower thermostat cuts out. In the meantime the room temperature continues to rise, not starting to fall again until the heating-chamber thermostat operates. Thus the actual oscillation of temperature about its mean value may exceed by several fold the nominal sensitivity of the thermostat.

This is an extreme example: in other systems the factors that determine the lag in response, the amplitude of the oscillation of temperature and the frequency of such oscillations may differ in detail, and "anticipatory" systems have been devised which are responsive to the rate of change of temperature rather than the change itself so as to minimize the amplitude of changes. In spite of this, however, such oscillations always occur, their frequency and amplitude being determined by a combination of factors including the sensitivity of the thermostat in terms of the margin between its off and on positions, the thermal capacity of the various portions of the systems and the rates of heating and cooling of these parts as affected by the rate at which heat is delivered to the system and the rates at which it is lost by radiation, convection, and conduction. In any such system the average temperature can be maintained constant or practically so. The energy required to maintain the average at a fixed value, for any given combination of ambient conditions will be the same and will depend upon the relative duration of the on and off periods. The amplitude of the fluctuation about the average, however, will always be a function of the lag introduced into the system by the various factors mentioned and will be proportional, at least to a first approximation, to the length of the cycle from off to on and back to off again.

Thermostatic control is but one of a number of examples of off-on controls of the type mentioned, although the one most commonly met with and practiced. Another is a control for maintaining constant pressure in a compressed-air or gas receiver. The present invention is applicable to any such system where a lag is involved and wherein the accuracy of the control exercised is adversely affected by the existence of such a lag. These other applications are, in general, somewhat specialized, but the existence of the problem will be recognized by anyone skilled in the art wherein the problem arises. The present invention is applicable to any situation wherein the problem is involved, but for the sake of simplicity it will be discussed as applied to a thermostatic control with the understanding, however, that it is not limited to this specific application.

The objects of the present invention include the provision of a control of the "on-off" type, the operation whereof is substantially unaffected by the lag in response of the system to which it is applied; the provision of an "on-off" system which is capable of nearly as great accuracy of control as a continuous system and the provision of a control circuit of the type described that is simple, economical, sensitive, stable and positive in operation.

In accordance with the present invention the power circuit to be controlled is opened or closed by the actuation of a relay included in circuit with one of the amplifying devices comprised in an astable multivibrator. As is well known, a multivibrator of this type includes two such amplifying devices, regeneratively cross-coupled so that the device as a whole has two quasi-stable states, in each of which one of the devices is conductive and the other non-conductive. Connected to each device is an integrating circuit which charges when the tube to which it is directly connected is conducting. When the charge on the integrating circuit reaches some definite value it triggers the opposite device, rendering it conducting, while the tube through which the charge was collected becomes non-conducting. The circuit thus oscillates between its two quasi-stable states at a rate which is determined primarily by the time constants of the integrating circuits and these are so set that in the absence of a control signal the interval during which either state is maintained is short in comparison with the lag of the control system so that the change in temperature (or other factor to be controlled) may remain as small as may be desired. The thermostat or other sensing element through which control is to be exercised operates by establishing a normal bias on the two integrating circuits, thus fixing the base potential from which they start to charge, and hence the charge they must collect and the time required to collect it before the multivibrator triggers, and varying these biases in opposite senses from the norm, in response to changes in condition to be controlled to change the proportions of the multivibrator cycle wherein the On and Off conditions obtain.

In order to accomplish this the two integrating circuits, instead of connecting to a point of common potential, are brought back to sides of a push-pull circuit which is so adjusted that at the desired operating point both sides carry equal current, there is an equal drop of potential across them, and the biases applied to the two integrating circuits are also equal. The sensing element is connected to vary the current in the two halves of the push-pull circuits in opposite senses in response to deviations from the norm, thus increasing one bias and decreasing the other. The result is that when the controlled conditions are stabilized, at or near the operating point, the length of the On-Off cycle remains nearly constant and it is only the proportion of the cycle occupied by the On and Off states that changes. Under starting conditions, however, these biases are thrown so far off balances that the active integrating circuit cannot charge to a triggering potential and the control remains on, without interruption, until the operating norm is approached. Cyclic operation then starts, the cycle quickly shortening to its normal value.

It will be seen that this type of control can be exercised by any type of sensing element that will supply a varying control potential to a push-pull amplifier. The preferred arrangement, however, employs a passive type of sensing element, such as a varistor or thermistor, as one arm of a Wheatstone bridge proportioned to balance at the desired control point and the control potential is taken off across the diagonal of the bridge, so that it reverses when the controlled condition passes through the norm. With the preferred form of the invention the Wheatstone bridge and the amplifying elements of the push-pull circuit are both supplied by alternating current from the same source, the two amplifiers being excited from this source in opposite phase. Under these circumstances the amplifiers also act as rectifiers, each conducting on one-half only of the cycle. The control potential from the diagonal to the bridge circuit is applied to the control electrodes of the amplifiers in parallel and is therefore in phase with the conducting half of the cycle as applied to one of the amplifying rectifiers and out of phase as applied to the other therefore increasing and decreasing effectively the amplitude of the pulsations carried by the two halves of the circuit. Filtering means are provided for converting these pulsations to substantially direct current; the biases for the multivibrator circuits are supplied by the outputs of the respective filters.

The nature of the invention will be more clearly understood from a detailed description of a preferred embodiment of the invention which follows, taken in connection with the single figure of the drawing which is a schematic circuit diagram of the invention as applied to a temperature control.

The apparatus illustrated in the figure is designed, specifically, for the control of temperature of an extrusion machine. Requirements for this application demand very close regulation of the temperature of the extruded material at the extrusion dies. The thermal capacity of the controlled apparatus is quite large but the rate of heat loss from radiation and various other causes is also quite high. To meet the requirements of the situation and to give the necessary accuracy of control, a normal operating cycle of approximately 10 seconds was determined upon. The structural parameters of the apparatus used, and which will be given in the course of the description, are those appropriate to a cycle of this length, but it is to be understood that they are illustrative only and that for other purposes the cycle length may differ from that of the present apparatus by orders of magnitude. Furthermore, although the apparatus shown employs vacuum tubes as its amplifying and controlling elements, transistors may be employed for the purpose in circuits closely comparable to those that will be described, the necessary changes to adapt the invention to the use of transistors being well known to those in the art.

The multivibrator circuit employed uses a dual tube, such as a 12AT7, containing, within its single envelope, two triode sections 1A and 1B. Excitation for both is derived from a conventional D.C. power supply, not shown, but connected to the terminal marked B+ and to ground. Connection is made from this terminal to anode 3A of the first tube section through the operating coil 5 of a relay which, upon closure of its armature 7, operates the power circuit to be controlled. This relay can be considered as merely symbolic; it may be replaced by the control circuit of a magnetic amplifier, or, where the power to be controlled is relatively small, by a power contactor directly. The relay coil is shunted, as is common practice, by a condenser 9. The anode 3B of the other tube section connects to B+ through an anode resistor 10 having a value of about 10 kilohms.

Except for the loads in their anode circuits the connections of the two triode sections are symmetrical, and their elements are designated by the same reference characters, distinguished by postscripts A and B respectively. In what follows, connections duplicated in the two sides of the circuit will be described using the numerical portion of the reference character only except where designation of the postscript is necessary for clarity. Cathodes 11A and 11B are connected in parallel and are provided with a common grid resistor 13 of 2.7 kilohms value, shunted by a 2 microfarad bypass and filter condenser 15.

Anode 3A connects through a condenser 17B to the grid 19B of the opposite section and a similar cross connection is made from anode 3B to grid 19A.

The integrating circuits, which determine the normal period of operation of the multivibrator each comprise a condenser 17 in series with a high value resistor 21. In the apparatus described, the condenser 17 has a capacity of 0.1 microfarad and the resistor 21 a value of 22 megohms, making the time constant of each of the integrating circuits 2.2 seconds. Resistors 21 connect, respectively, to similar biasing circuits, comprising resistors 23 shunted by condensers 25. The resistors each have a value of about 10 kilohms and the condensers of 2 microfarads.

Except for the biasing circuits the connections described are those of one well known multivibrator configuration. Several generally similar configurations are almost equally well known and any of these may be employed with suitable minor modifications in circuitry.

The operation of multivibrators generally is so well known that no detailed explanation of their operation should be necessary. The circuit has two quasi-stable states, with one tube fully cut-off and the other wholly conducting, and due to the regenerative cross-connections anything tending to initiate a change of state carries through to cause an immediate reversal. In the circuit shown the change is initiated by grid current in the conducting tube charging condenser 17 of the integrating circuit negatively until it starts to reduce the current, and the state reverses. The time required to collect the reversing charge depends upon the bias applied to the grids as well as on the time-constants of the integrating circuits; the time-constant governs the rate at which the grid potential approaches cut-off value at a given rate of current flow, the bias governs both the amount of charge that must be collected to reach this value and rate at which it is approached, i.e., whether a part or all of the collected grid current leaks off through the resistor or whether additional electrons from the bias source accelerate the cut-off. The present invention controls the On and Off times by changing the biases in opposite directions.

The biasing circuits connect, respectively, to ground from the cathodes 27 of a pair of triodes, in this case the two halves 29 of a dual tube such as a 12AU7. Corresponding anodes 31 connect through equal resistors 32 for excitation in opposite phase by an alternating potential, in this case applied from a center tapped secondary winding 33 of a transformer 35, the center tap being grounded. The grids 37 are connected in parallel, their mean potential being established at ground level through a grid resistor 39. They receive their actuating signals from the sensing circuit through a bypass condenser 41.

The sensing element shown illustratively is a thermistor, indicated as a variable resistor 43. In the figure it is shown as adjacent to resistor 45, indicated as being supplied from the controlled power circuit, to symbolize the source of the heat to which it responds. The thermistor forms one arm of a Wheatstone bridge. The other arms of the bridge comprise a pair of ratio resistors, 47, 47' and a rheostat 49, whereby the bridge may be balanced at any desired temperature of the thermistor. The bridge is supplied, across one of its diagonals, by alternating current from the secondary winding 51 of a transformer 53 whose primary 55 is connected to the same source of alternating current as that which supplies the primary winding 57 of transformer 35. It is, of course, unnecessary that a separate transformer be used to supply the operating currents and potentials; windings 33 and 51 may be disposed on a single core for supply from the same primary winding. What is necessary is that the alternating currents and potentials supplied by the two secondaries be accurately in phase.

As is the case in any bridge circuit, the potential across the diagonal of the bridge opposite from the supply is zero when the bridge is in balance and varies in amplitude with the degree of unbalance. In passing through balance the potential across the diagonal reverses in phase. The output potential across the diagonal between the grounded junction of ratio arms 47, 47' and arms 43, 49 is supplied to the grids 37 preferably, although not necessarily, through an amplifier 59 the gain around the control loop and consequently the sensitivity of the apparatus being increased by the use of the amplifier. When the bridge is out of balance the control signal is in phase with either the potential on anode 31A or 31B. Owing to their unidirectional conductive characteristics, each triode conducts during one-half only of the alternating cycle; at the operating point both triodes conduct on their respective halves of the cycle, each being, in effect, a halfwave rectifier. When, however, the bridge is far out of balance, as at the initiation of operation, before any material heating of the thermistor has occurred, the potential on the out-of-phase grid is preferably high enough to cut-off the tube completely while the grid that is in phase with the supply potential to the tube is excited to cause maximum conduction.

Each of the biasing circuits connecting to the cathodes of triodes 29 is, in effect, an RC filter circuit. With the element values given, the time constants of each of these circuits is approximately 0.2 second, which is long in comparison with their 60 cycle charging rate and eliminates all but a very small ripple in the bias voltage that they supply; the time constant is, however, short in comparison with the normal period of the multivibrator so that the biases developed across these circuits can follow the output from the bridge circuit closely enough to give a very rigid and exact control.

Using the circuit parameters here given the period of the multivibrator, when the bridge is in balance and biases on both of its tubes are equal, is about 10 seconds. At maximum unbalance of the bridge, with one triode 29 completely cut-off and the other fully conducting, the positive bias on the conducting half of the multivibrator is so great that grid current leaks off as fast as it can accumulate and the tube therefore fails to cut off. The grid of the opposite tube is, at the same time, held far negative. As balance is approached, the previously cut-off tube 29 starts to conduct while the current in the other tube decreases until a point is reached where oscillations of the multivibrator start. Initially the period will be somewhat longer than the norm, the Off periods being very short in comparison to the On periods. As conditions stabilize the cycle assumes substantially constant length, the On and Off period being proportionated to make the ratio of the On period to the length of the entire cycle equal to the ratio of the energy required to maintain the desired condition to the total energy available. Because the rates of charge and discharge of the integrating circuits are logarithmic functions, the total length of the cycle is not strictly a constant, but it is very nearly so and is deviation from constancy is immaterial.

It will be recognized that other multivibrator configurations employ other mechanisms for triggering the change of state. For example, the integrating circuit can be so biased as to drive the grid of the non-conducting tube positive to the point where conduction starts in this tube before the flow of grid current causes the conducting tube to start to cut-off. Such operation is equally as effective to cause the change of state as that first described and it is evident that the times required to charge and discharge are equally dependent upon the relative biases on the two sides of the multivibrator circuit.

The transistor multivibrators differ in detail, but the period of the astable type similarly depends upon the charging of integrating circuits, the time constants thereof and the biases applied thereto in the same manner as where tubes are employed. The invention therefore does not reside in the specific configurations used in the various portions of the device nor in the type of amplifier element employed. The example given is intended to be illustrative merely, and all intended limitations upon the scope of the invention are specifically set forth in the claims.

What is claimed is as follows:

1. Apparatus for controlling the average power delivered to a load circuit by varying said power between two fixed values for varying intervals, comprising an astable multivibrator having two quasi-stable states, the duration of each of which is variable in response to variations in a biasing potential, an output circuit for said multivibrator including relay means adapted to close said load circuit when said multivibrator is in one of said quasi stable states and open said load circuit when in the other of said states, and means for developing biasing potentials varying in opposite senses to vary oppositely the durations of said states comprising a push-pull amplifier having two output circuits, a pair of integrating circuits connected respectively in said output circuits and each comprising a condenser and a leak resistance in parallel therewith and connections from said integrating circuits to said multivibrator for applying potentials developed thereacross as said respective biasing potentials, a sensing element responsive to variations in the power controlled to develop a varying electrical potential, and means for applying said electrical potential to control said push-pull amplifier.

2. Apparatus as defined in claim 1 wherein said push-pull amplifier includes means for supplying alternating current in opposite phase to the two output circuits thereof, and the electrical potential developed by said sensing element is alternating and reversible in phase.

3. Apparatus for controlling power in response to a sensing element affected by the controlled power to vary an electric current, comprising an astable multivibrator including two amplifying devices regeneratively cross coupled to assume alternately two quasi-stable states in each of which one of said devices is conducting and the other non-conducting the duration of each of said states being variable by biases applied to said devices respectively, relay means for controlling said power connected in series with one of said devices, a push-pull amplifier having two output circuits connected to respond in opposite senses to variations in said electric current, an integrating circuit in each of said output circuits, and connections from said integrating circuits for biasing said amplifying devices respectively for varying the duration of said quasi-stable states in opposite senses.

4. Apparatus for controlling the average power delivered to an output circuit comprising a sensing element responsive to variations in the power delivered connected as one arm of a bridge circuit, a pair of unidirectionally conducting amplifying devices each having a control electrode, means for supplying alternating current in opposite phase to said amplifying devices and current in phase with that supplied to one of said amplifying devices to one diagonal of said bridge circuit, connections for applying to both of said control electrodes a voltage of the same phase and proportional to that developed across the other diagonal of said bridge, a pair of integrating circuits each comprising a condenser and a leak-resistor in parallel therewith connected respectively to integrate current through said amplifying devices, an astable multivibrator having two quasi-stable states the duration of each of which is variable in response to an independently supplied bias voltage, connections for applying said bias voltages to said multivibrator from said integrating circuits respectively, an output circuit for said multivibrator, and relay means in said output circuit for directly controlling said power.

5. In a power controlling system of the type wherein the instantaneous power delivered alternates between two fixed values and the average power delivered is determined by the relative length of the periods wherein the power of said values is delivered, control apparatus comprising an inherently astable multivibrator including a pair of amplifying devices, a pair of integrating circuits connected respectively to said devices to charge when the connected device is in a conducting state and regenerative cross-connections between said devices and said integrating circuits to cause a charge collected by either of said integrating circuits to trip said multivibrator so as to render the previously conducting device non-conducting and vice versa, power switching means connected in series with one of said devices, a sensing element responsive to changes effected by delivery or interruption of power by said switching means to alter the flow of current, and means connected to both of said integrating circuits for adding algebraically to the charging rates thereof in response to alterations in current flow by said sensing element.

6. In a power controlling system of the type wherein the instantaneous power delivered alternates between two fixed values and the average power delivered is determined by the relative length of the periods wherein power of said values is delivered, control apparatus comprising an inherently astable multivibrator including a pair of amplifying devices, a pair of integrating circuits connected respectively to said devices to charge when the connected device is in a conducting state and regenerative cross-connections between said devices and said integrating circuits to cause a charge collected by either of said integrating circuits to trip said multivibrator to render a previously conducting device nonconducting and vice versa, power switching means connected in series with one of said devices, a sensing element responsive to changes effected by delivery or interruption of power by said switching means to alter a flow of current, a second pair of amplifying devices so connected for control by said sensing means as to render one or the other thereof unidirectionally conducting in response to the alterations in current flow through said sensing means, and connections from each of said second amplifying devices through said integrating circuits respectively to vary the charging rates thereof when the connected one of said second amplifying devices is conducting.

References Cited in the file of this patent

UNITED STATES PATENTS 2,654,057    Rivenburg    Sept. 29, 1953
2,713,130    Weiller    July 12, 1955

OTHER REFERENCES

Minor: "Radio-Electronics," vol. 22, No. 8, May 1951; pp. 56, 58, 60 and 62.